(12) United States Patent
Fan et al.

(10) Patent No.: US 8,811,152 B2
(45) Date of Patent: Aug. 19, 2014

(54) SYSTEM AND METHOD TO SUPPORT SECONDARY CHANNEL CONNECTION FROM RESIDENTIAL GATEWAY TO SERVICE PROVIDER NETWORK

(75) Inventors: James Fan, San Ramon, CA (US);
Lipton Chin-Loy, Duluth, GA (US);
Richard Kuo, Mountain View, CA (US);
Jennifer Lam, Fremont, CA (US);
Chandrasekaran Sundaramurthy, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 558 days.

(21) Appl. No.: 12/608,256

(22) Filed: Oct. 29, 2009

(65) Prior Publication Data
US 2011/0103392 A1    May 5, 2011

(51) Int. Cl.
*H04L 12/50* (2006.01)
*H04Q 11/00* (2006.01)
*H04L 12/24* (2006.01)
*H04L 12/56* (2006.01)

(52) U.S. Cl.
CPC ........ *H04L 41/0668* (2013.01); *H04L 41/0654* (2013.01); *H04L 41/069* (2013.01); *H04L 45/28* (2013.01)
USPC ............................ 370/217; 370/218; 370/221

(58) Field of Classification Search
None
See application file for complete search history.

(56) References Cited

U.S. PATENT DOCUMENTS

| | | | |
|---|---|---|---|
| 6,542,934 B1 | 4/2003 | Bader et al. | |
| 7,983,670 B1 * | 7/2011 | Elliott | 455/426.2 |
| 2003/0039208 A1 * | 2/2003 | Soumiya | 370/216 |
| 2004/0133689 A1 * | 7/2004 | Vasisht | 709/228 |
| 2005/0174935 A1 * | 8/2005 | Segel | 370/228 |
| 2007/0186113 A1 * | 8/2007 | Cuberson et al. | 713/183 |
| 2009/0213730 A1 * | 8/2009 | Zeng et al. | 370/217 |
| 2010/0008259 A1 * | 1/2010 | Yoon et al. | 370/254 |

OTHER PUBLICATIONS

Bjorn Landfeldt, Jahan Hassan, Albert Y. Zomaya, Suparerk Manitpornsut and Riky Subrata, Titan: A New Paradigm in Wireless Internet Access Based on Community Collaboration, Proceedings of The 2006 International Conference on Wireless Communications and Mobile Computing, pp. 331-336, Jul. 6, 2006.*

S. Sarkar, S. Dixit, B. Mukherjee, Hybrid Wireless-Optical Broadband-Access Network (WOBAN): A Review of Relevant Challenges, Journal of Lightwave Technology, vol. 25, Issue 11, pp. 3329-3340, Nov. 2007.*

J. Evans, W. Wang, B. Ewy, Wireless networking security: open issues in trust, management, interoperation and measurement, Int. J. Security and Networks, vol. 1, Nos. 1/2, pp. 85-94, 2006.*

Author Unknown, Advanced Redundant Connection, as archived by the internet archive, www.archive.org, on Oct. 2008, pp. 1-2.*

(Continued)

*Primary Examiner* — John Blanton
*Assistant Examiner* — Christopher Crutchfield
(74) *Attorney, Agent, or Firm* — Toler Law Group, PC

(57) ABSTRACT

The present disclosure is directed to an apparatus and method for providing service to a residential gateway. The method includes detecting a service disruption associated with a first connection to a first residential gateway device. In response to the detected service disruption, a second residential gateway device selected at the first residential gateway may be used to establish a second connection to the first residential gateway device.

17 Claims, 5 Drawing Sheets

(56) References Cited

OTHER PUBLICATIONS

K. Owens, S. Makam, B. Mack-Crane, and C. Huang, A Path Protection/Restoration Mechanism for MPLS Networks, IETF Draft, draft-chang-mpls-path-protection-02, Nov. 2000, pp. 1-24.*

Author Unknown, Usage Based Billing for the Cisco CMTS, pp. 1-66, May 6, 2009.*

Iswar Ramani, Stefan Savage, SyncScan: Practical Fast Handoff for 802.11 Infrastructure Networks, Proceedings of INFOCOM'05, Mar. 2005, pp. 1-10.*

* cited by examiner

SYSTEM AND METHOD TO SUPPORT SECONDARY CHANNEL CONNECTION FROM RESIDENTIAL GATEWAY TO SERVICE PROVIDER NETWORK

FIELD OF THE DISCLOSURE

The present disclosure relates generally to network communications, and more particularly, to establishing and maintaining the network functionality of customer premises equipment in a digital network.

BACKGROUND

Residential gateway devices provide networked interfaces to connect local customer devices to the Internet, or to other sources of audio, video, voice, and data. Residential gateway devices also provide revenue opportunity for communication service providers. Disruptions in service to residential gateway devices consequently impact both customers and service providers. For example, customer satisfaction may suffer until a service disruption is resolved. Because telephone and Internet connectivity may both be affected by a disruption, a customer may be inconvenienced to use an alternative communication device to report the disruption. Similarly, a disruption, such as a failed communication link, may impede an ability of the service provider to independently detect, log or diagnose a status of the residential gateway device.

DETAILED DESCRIPTION OF THE DRAWINGS

In a particular embodiment, a method of providing service to a residential gateway device is disclosed. The method includes detecting a service disruption associated with a first connection to a first residential gateway device. In response to the detected service disruption, a second residential gateway device selected at the first residential gateway may be used to establish a second connection to the first residential gateway device.

In another embodiment, an apparatus is disclosed that includes a wide area network module coupled to an access node of a service provider via a first connection. The access node is configured to provide a service to a plurality of gateway devices. The apparatus further includes a local area network module coupled to at least one local computing device. A first secondary channel module is coupled to the local area network module and is configured to be coupled to a second residential gateway device of the plurality of gateway devices to establish a second connection to the access node of the service provider.

In another embodiment, a processor readable medium embodying executable instructions is disclosed. The executable instructions include instructions to detect a service disruption at a first residential gateway device. The service disruption is associated with a first connection to a service provider. The instructions initiate selecting and communicating with a second residential gateway device to establish a second connection to the service provider in response to the detected service disruption.

Figure 1:
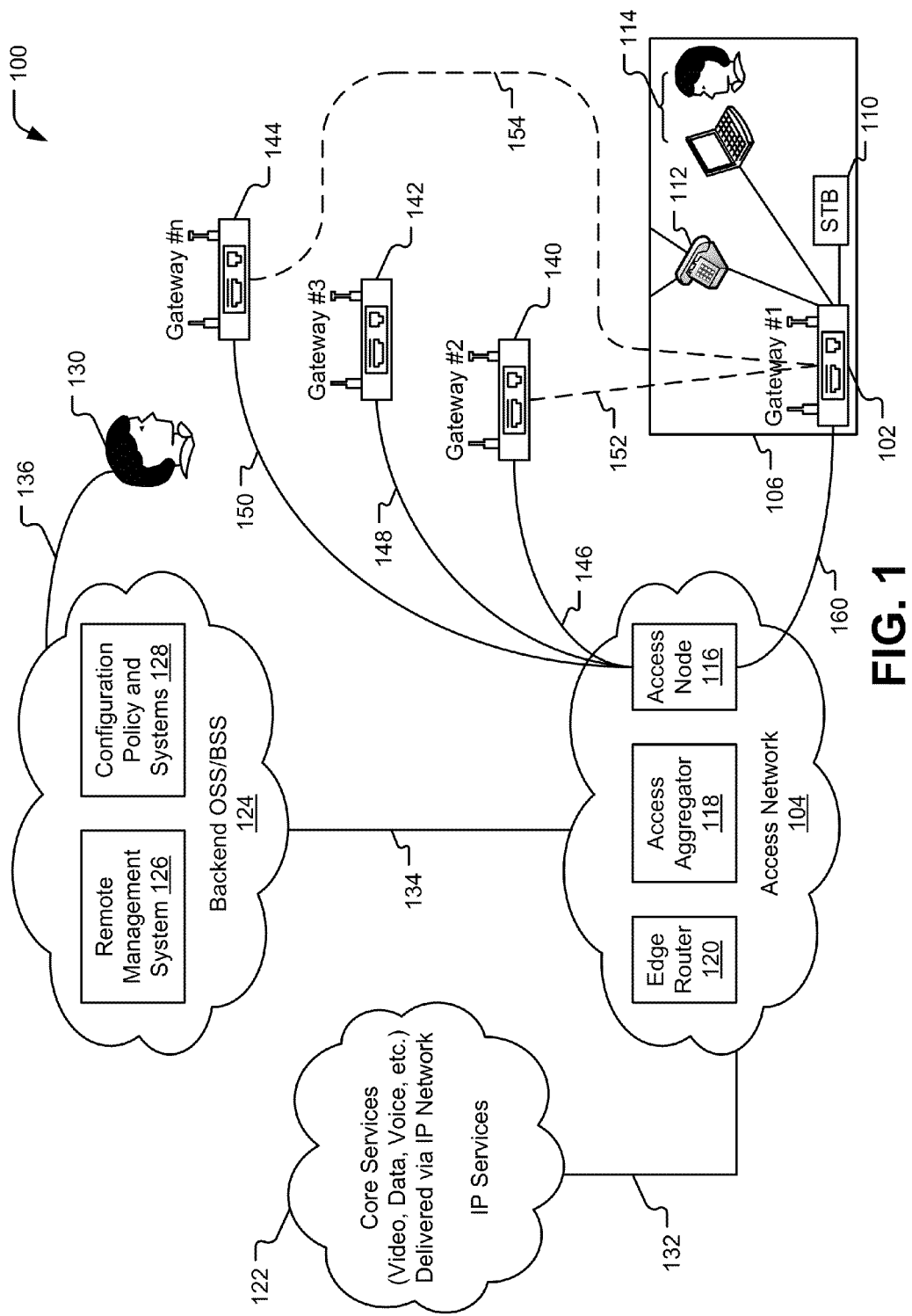
FIG. 1 is a block diagram of a particular illustrative embodiment of a communication system to establish a secondary connection from a residential gateway device to a service provider.

Referring to FIG. 1, a representative distributed communication system 100 is illustrated. The system 100 includes a source of core services 122, an access network 104, a backend operations support system (OSS) and business support system (BSS) 124, and a plurality residential gateway devices 102, 140, 142, 144. Each of the residential gateway devices, such as the illustrated second residential gateway device 140 and the $n^{th}$ residential gateway device 144, may be routed or otherwise communicatively coupled to a first residential gateway device 102. The first residential gateway 102 is within a customer premises environment 106. The first residential gateway device 102 may be coupled to electronic devices, such as a set-top box 110. The first residential gateway 102 may be coupled to other electronic devices within the residential environment 106, such as a telephone 112 and a laptop computer 114.

The core services 122 may include a plurality of services that may be offered by a communication service provider. For example, the core services 122 may include triple play services (video, data, and voice) and other services deliverable via an Internet protocol (IP) network. The core services 122 are coupled via a communication path 132 to the access network 104. The access network 104 includes one or more edge routers 120, access aggregators 118, and access nodes 116.

The access network 104 is coupled via a second communication path 134 to the back-end OSS/BSS 124. The back-end OSS/BSS 124 includes a remote management system 126 and a configuration policy-related system 128. The back-end OSS/BSS 124 is managed by an administrative user, such as an illustrated user 130 having access to an administrative interface 136. An example of an administrative user may be an operator of a communication network console to manage a distributed communication network.

The access node 116 within the access network 104 is coupled to one or more residential gateway devices. For example, a representative access node 116 is coupled to the first residential gateway device 102 via a communication path 160 and is coupled to the second residential gateway device 140 via a communication path 146. The access node 116 is further coupled to the third residential gateway device 142 via a communication path 148, and is coupled to the representative $n^{th}$ residential gateway device 144 via a communication path 150.

Each of the communication paths 146, 148, 150, 160 may be implemented with communication technologies. For example, each of the communication paths 146, 148, 150, 160 may be implemented using fiber optic links, coaxial cables, twisted pair lines, or other wired connections. Alternatively, the communication paths may be implemented using wireless technologies, such as high speed ultra wide band or Worldwide Interoperability for Microwave Access (WiMax). While specific data communication technologies have been described, it should be understood that a wide variety of technologies may be utilized to provide data communications between the access network 104 and one or more of the residential gateway devices 102, 140, 142, 144.

During operation, the access node 116 of the access network 104 may be used to deliver services originated from the core services 122 to one or more of the illustrated residential gateway devices 102, 140, 142, 144. For example, the core services 122 may provide IP services via the access network 104, and in particular, the access node 116, to the first residential gateway device 102. However, during the delivery of services, a communication path may experience a disruption. For example, the communication path 160 may experience a link failure. In such an event, the first residential gateway device 102 may experience a disruption of delivery of the IP services.

In an attempt to provide resumed service, the first residential gateway device 102 may initially perform a self-healing diagnostic test or other similar repair mechanisms. Upon indication that the diagnostic test failed or that the disrupted path 160 may not be repaired quickly, the first residential gateway device 102 may seek alternative paths. For example, the first residential gateway device 102 may communicate with multiple neighboring gateways. For example, the first residential gateway device 102 may attempt to communicate with the second residential gateway device 140 and the $n^{th}$ residential gateway device 144. It should be noted that not all residential gateway devices have peer-to-peer communication capabilities. For example, the representative third residential gateway device 142 may not be within range or may not have the ability to communicate with the first residential gateway device 102. Alternatively, the third residential gateway device 142 may not include the functionality to communicate with the first residential gateway device 102 or may be disabled by a user or other mechanism.

Thus, the first residential gateway device 102 communicates with other residential gateway devices that are capable of communication and that are within range. For example, the first residential gateway device 102 may attempt to initiate communications via a first alternate path 152 to the second residential gateway device 140 and via a second alternate path 154 to the $n^{th}$ residential gateway device 144. A particular methodology used to attempt to establish alternative connections may be pre-configured during installation time or may be dynamically modified by the first residential gateway device 102.

In response to the request for alternate communication paths or alternate communications via the alternate communication paths 152 and 154, the second residential gateway devices 140 and 144 may send one or more responses to the first residential gateway device 102. Based on the responses, the first residential gateway device 102 may apply one or more criteria to identify a preferred residential gateway device to assist with communication. Examples of parameters that may be used to make the alternate residential gateway device selection include policy determinations, a determined bandwidth capacity, as well as a detected signal strength associated with the potential alternate residential gateway devices.

Based on the particular policies, configuration parameters, and measurements as described, the first residential gateway device 102 selects one of the alternate residential gateway devices. For example, the first residential gateway device 102 may select the second residential gateway device 140. After selection, the first residential gateway device 102 provides signaling via the alternate path 152 to the second residential gateway device 140. The second residential gateway device 140, in turn, communicates via the communication path 146 to the access node 116.

The access network 104 including the access node 116 receives notice of the disruption of the communication path 160. The access network 104 may also receive notice that the first residential gateway 102 is being assisted by the second residential gateway 140. Upon such notice, the access node 116 reconfigures services from the core services network 122 and routes such services and data associated therewith, via the second communication path 146 to the second residential gateway device 140. Thus, the second residential gateway device 140 may be used as a bridging mechanism to route data from the originating core services 122 via the access node 116 to the final destination of the first residential gateway device 102. Upon receipt of the rerouted data, the first residential gateway device 102 may restore communication services, such as triple play services, on behalf of a representative user 114 within the residential environment 106.

Logs within one or more of the first residential gateway device 102 and the second residential gateway device 140 may store utilization data relating to the first residential gateway device 102 and the second residential gateway device 140. The utilization data may include a separate accounting of services provided to each of the first residential gateway device 102 and the second residential gateway device 140.

FIG. 1 thus shows a system 100 configured to restore service to a residential gateway device experiencing a disruption. Benefits include allowing dynamic restoration of a disrupted service. Other benefits include a reduced level of service calls and decreased instances of a loss of service. Another benefit involves additional sources of revenue and billing opportunities. For example, the disruption and alternative routing methodology may be offered as an enhanced service for particular subscribers. A subscriber to a communication service may opt for a subscription plan with higher subscription fees in order to have improved reliability of service through the use of the alternative gateway routing process described herein. Alternatively, an owner of a second gateway 140 may receive a discounted rate for participating in a dynamic gateway recovery program that enables communication with the first residential gateway device 102 in the event of a service disruption.

From a network operator standpoint, the system 100 may offer reduced calls to customer care centers and reduced trouble shooting activities, such as trouble tickets resulting from service disruptions, thereby reducing costs of providing the core services 122. Thus, the system 100 offers benefits for both service providers and users of communication services.

The system 100 offers methods and apparatus to support establishment of pre-provisioned secondary channels at the time of initial customer premises equipment (CPE) installation. In addition, the system 100 may be used to provide methods and apparatus to support dynamic secondary channel establishment when a network connection is lost. A secondary channel interface architecture of one or more of the residential gateway devices 102, 140, 142, 144 may also be utilized to support dynamic secondary channel establishment and repair activities.

Figure 2:
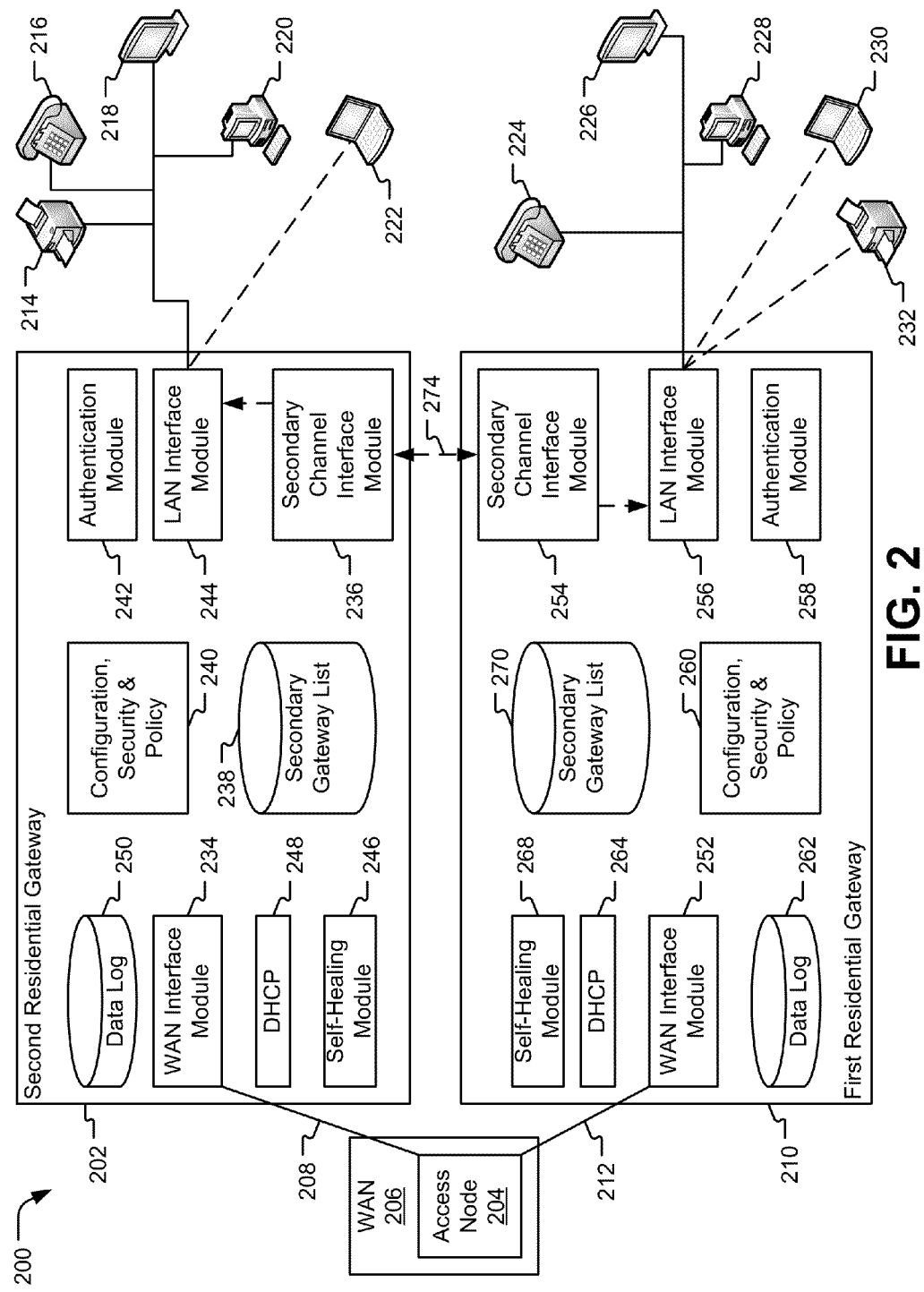
FIG. 2 is a block diagram showing further details of a communication system that includes representative first and second residential gateway devices that may be used in connection with the communication system of FIG. 1.

Referring to FIG. 2, further details are shown of a communication network 200 that includes representative first and second residential gateway devices that may be used in connection with the communication system 100 of FIG. 1. A portion of the communication network 200 includes a first representative residential gateway device 210 and a second representative residential gateway device 202. In a particular embodiment, the first residential gateway device 210 may be the first residential gateway device 102 of FIG. 1. The second residential gateway device 202 may be the second residential gateway device 140 of FIG. 1.

The first residential gateway device 210 is communicatively coupled to an access node 204 of a wide area network (WAN) 206. For example, the access node 204 may be similar to or the same as the access node 116 of FIG. 1. Similarly, the wide area network 206 may be similar to or the same as the access network 104 of FIG. 1.

The first residential gateway device 210 includes a plurality of logic and/or computing elements. For example, the first residential gateway device 210 includes a self-healing module 268, a Dynamic Host Configuration Protocol (DHCP) module 264, a wide area network (WAN) interface module 252, a secondary channel interface module 254, a local area network (LAN) interface module 256, and an authentication module 258. The first residential gateway 210 also includes configuration security and policy information 260, a data log 262, and a secondary gateway list 270.

The second residential gateway device 202 includes a plurality of components similar to those described with respect to the first residential gateway device 210. For example, the second residential gateway 202 includes a WAN interface module 234, a DHCP module 248, a self-healing module 246, an authentication module 242, a LAN interface module 244, and a secondary channel interface module 236. Similarly, the second residential gateway device 202 includes a secondary gateway list data store 238 and a data log 250. The second residential gateway device 202 is communicatively coupled to the access node 204 by a representative communication path 208.

The first residential gateway device 210 is coupled either directly or indirectly to one or more of a plurality of devices. For example, the first residential gateway device 210 may be coupled to one or more of a representative printer 232, a portable computer 230, a desktop computer 228, and a telephone 224. Similarly, the first residential gateway device 210 may be coupled via a LAN (via the LAN interface module 256) to other devices, such as the representative display device 226. It should be understood that the first residential gateway device 210 may be coupled via the LAN interface module 256 to a variety of devices, such as various consumer electronic devices 224, 226, 228, 230, 232.

Similarly, the second residential gateway device 202 may be coupled to one or more of a plurality of devices. For example, representative devices include a portable computer 222, a desktop computer 220, a display device 218, a printer 214, and a telephone or other representative communication device 216. Like the first residential gateway device 210, the second gateway device 202 may generally include a home networking device, used as a gateway to connect devices in the home to the Internet or other WAN in order to provide one or more of voice, data, and video services.

Each of the residential gateway devices 202, 210 may be implemented by an apparatus that comprises a WAN module coupled to an access node of a service provider via a connection. For example, the first residential gateway 210 includes the WAN interface module 252 that is coupled to the access node 204. The access node 204 may be a node within a WAN 206 of a service provider. The WAN interface module 252 is coupled to the access node 204 via the first data connection 212. The access node 204 may be configured to provide one or more services to a plurality of residential gateway devices. For example, the access node 204 may provide communication services to the first residential gateway device 210 and to the second residential gateway device 202.

The first residential gateway device 210 also includes a LAN module, such as the illustrated LAN interface module 256. The LAN module 256 is in direct or indirect communication with the WAN module 252 and is coupled to at least one local computing device. For example, the LAN interface module 256 is in communication with the WAN interface module 252 and is coupled to one or more of the plurality of local computing devices 224, 226, 228, 230, 232.

The first residential gateway device 210 also includes a first secondary channel module 254 that is coupled the LAN interface module 256. The secondary channel interface module 254 is configured to be coupled to a second residential gateway device. For example, the secondary channel interface module 254 is configured to be coupled via the communication path 274 to the second channel interface module 236 of the second residential gateway 202. The communication path 274 may include part of a secondary, or alternative, connection that allows the first residential gateway device 210 to communicate with the second residential gateway device 202, and ultimately, the access node 204. The connection 274 between the first residential gateway device 210 and the second residential gateway device 202 may enable the second residential gateway device 202 to establish a secondary connection via a communication path 208 to the access node 204.

The communication path 274 from the secondary channel interface module 254 to the secondary channel interface module 236 may be established in response to a service disruption associated with the first communication path 212. The communication path 274 may be configured when the first residential gateway device 210 is initially installed. Alternatively, the communication path 274 may be dynamically configured in response to a user command, in response to a detected service disruption, or another dynamic methodology.

Access from the first residential gateway device 210 to a third residential gateway device (not shown) may be restricted based upon a policy or other stored parameters that are associated with the third residential gateway. For example, referring to FIG. 1, access to certain or all services associated with the third gateway 142 may be blocked or otherwise restricted based upon a policy associated with the third gateway device 142.

The first residential gateway 210 includes the secondary gateway list 270. The secondary gateway list 270 identifies a plurality of residential gateway devices that may be accessible to the first residential gateway device 210. For example, the secondary gateway list 270 stores a list of a plurality of prioritized residential gateway devices. The prioritized list of residential gateway devices may include one or more of the gateway devices 140, 142, 144 shown in FIG. 1. The prioritized list of residential gateway devices may include the second representative gateway device 202.

The data log 262 may maintain a record of use of services by the first residential gateway 210. For example, the data log 262 may include secondary channel related events. The configuration, security, and policy information 260 may be accessed to provide credentials for services. The data log 262 and the secondary gateway list 270 are illustrated as databases. However, it should be understood that any data store may be used to store data at the data log 262 and the secondary gateway list 270.

The self-healing module 268 of the first residential gateway device 210 may be configured to troubleshoot a potential disruption of service and to initiate internal software repairs. The self-healing module 268 may further be configured to detect a service disruption in the communication path 212. The self-healing module 268 may additionally initiate processes at the secondary channel interface module 254.

The authentication module 258 may be used to provide a credential to the second residential gateway 202. The authentication module 258 may additionally or alternatively receive a credential from the second residential gateway 202. According to one embodiment, the first residential gateway 210 and the second residential gateway 202 may mutually authenticate prior to establishing the secondary communication path 274.

The DHCP module 264 may establish internet address connectivity by obtaining configuration information to operate within an IP network. The WAN interface module 252 may provide connectivity of the first residential gateway device 210 to the access node 204 via the communication path 212. The first secondary channel interface module 254 may initiate communications with the second secondary channel interface module 236 of the second residential gateway 202.

Similar to the first residential gateway 210, the second residential gateway 202 may include a data log 250 configured to store data access information relating to traffic transmitted using the second connection between the first secondary channel interface module 254 and the second channel interface module 236. The data log 250 may additionally and separately store data access information relating to access by the first residential gateway device 210 via the communication paths 208 and 274.

The WAN interface module 234 may be configured to communicate with the access node 204 of the WAN 206. The DHCP module 248 may be configured to assign local IP addresses for customer-premises equipment. The self-healing module 246 may be configured to troubleshoot a potential disruption of service and to initiate software repairs.

The secondary gateway list 238 may include a listing of residential gateway devices available for establishing a secondary connection. The configuration, security, and policy information 240 may be used to initiate communications and grant permissions based on rules as to secondary connectivity. The authentication module 242 may be configured to authenticate the second connection 274. The authentication module 242 may include an algorithm or a credential used to authenticate information provided from the authentication module 258 of the first residential gateway device 210.

The LAN interface module 244 may be configured to interface with various devices. For instance, the LAN interface module 244 may be configured to communicate with a printer 214, a telephone device 216, a display 218, a desktop computer 220, and a laptop computer 222.

The secondary channel interface module 236 may use a communication path 274 to establish a secondary channel on the access node 204 on behalf of the first residential gateway device 210.

The communication path 208 may include a portion of the secondary channel for the first residential gateway device 210. In operation, the self-healing module 268 of the first residential gateway device 210 may detect a service disruption. For instance, a loss of service may be experienced with respect to the communication path 212. The self-healing module 268 may prompt the secondary channel interface module 254 to establish a secondary channel communication path.

The secondary channel interface module 254 may access the secondary gateway list 270 to identify pre-configured residential gateway devices that are potentially available for establishing a secondary connection. Alternatively, the secondary channel interface module 254 may dynamically determine a list of potential residential gateways devices. The secondary gateway list 270 may thus be pre-populated upon installation, dynamically populated at the time of the service disruption, or both. The secondary gateway list 270 may be prioritized based on one or more predetermined criteria, such as a policy, a bandwidth, or a strength of a signal associated with a residential gateway device included in the secondary gateway list 270.

The secondary channel interface module 254 may select, based on the predetermined criteria, a potential residential gateway device with which to create the secondary connection. For example, the secondary channel interface module 254 may attempt to establish communications with the secondary channel interface module 236 of a selected residential gateway device 202.

The authentication module 258 may provide, via the communication path 274, authentication information (e.g., a credential) used to authenticate the secondary connection at the authentication module 242 of the second residential gateway device 202. The authentication module 242 of the second residential gateway device 202 may verify the authentication information provided by the authentication module 258 of the first residential gateway device 210. Where so configured, the authentication module 242 of the second residential gateway device 202 may also provide authentication information to the authentication module 258 of the first residential gateway device 210. In such a scenario, the authentication module 258 of the first residential gateway device 210 may additionally authenticate the authentication information provided by the authentication module 242 of the second residential gateway device 202. Authentication information may thus be provided from just one or both the authentication module 258 of the first residential gateway device 210 and the second authentication module 242 of the second residential gateway device 202.

FIG. 2 thus shows a system 200 for establishing a secondary communication path to a residential gateway 210 that includes authentication features that facilitate peer-to-peer communication between the first residential gateway 210 and the second residential gateway 202. The authentication modules 242 and 258 may facilitate the secure establishment of the secondary connection without direct intervention from the WAN 206 of the service provider. This direct access may provide for faster recovery in an event of a service disruption.

Figure 3:
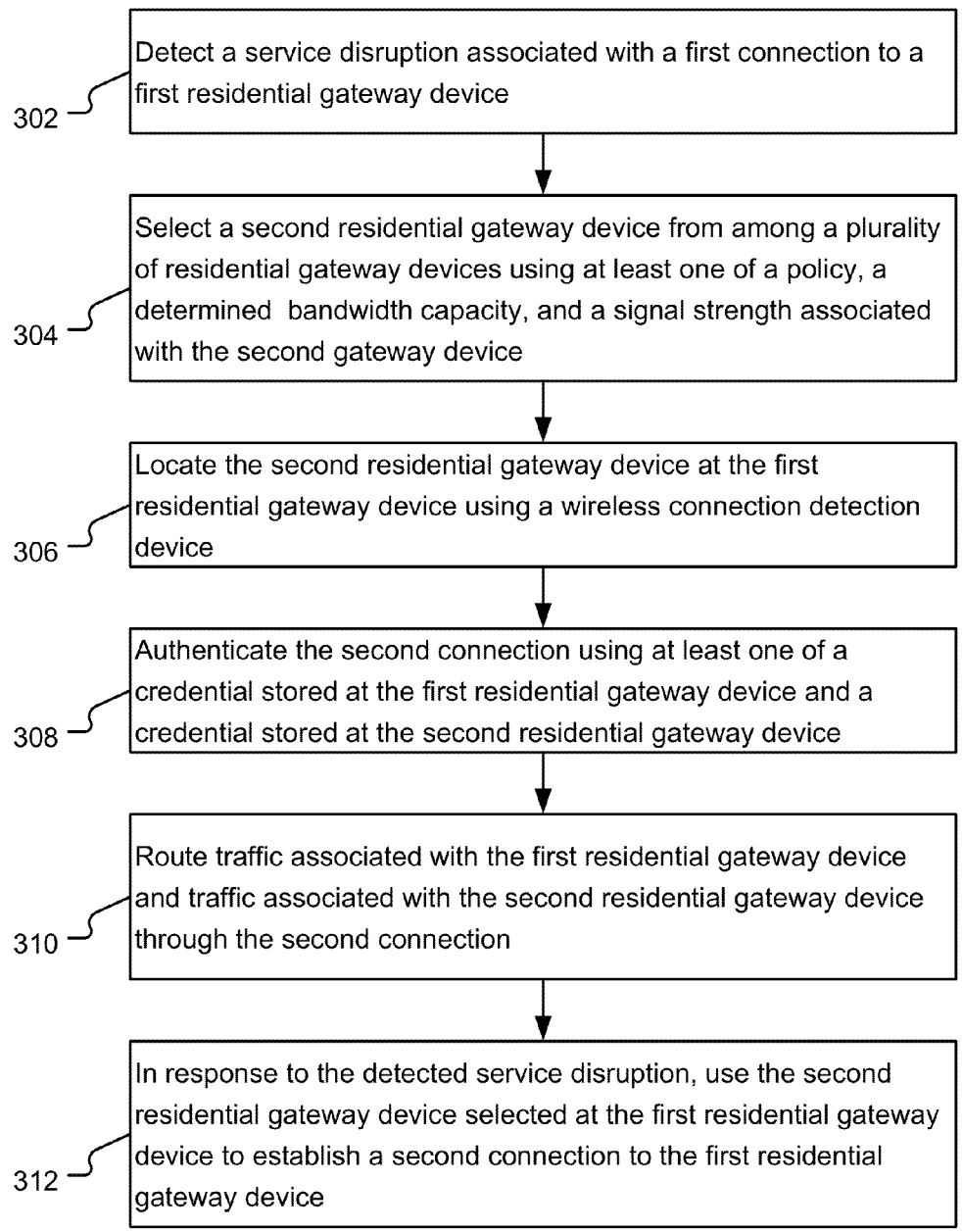
FIG. 3 is a flow diagram of a particular illustrative embodiment of a method of providing a service to a residential gateway device in response to a service disruption.

Referring to FIG. 3, a particular illustrative embodiment of a method of providing service to a residential gateway device is shown. The method includes detecting a service disruption associated with a first connection to a first residential gateway device, at 302. For example, the first residential gateway device 102 of FIG. 1 may detect a failure of a link, such as communication path 160.

The method further includes selecting a second residential gateway device from among a plurality of residential gateway devices using at least one of a policy, a determined bandwidth capacity, and a signal strength associated with the second gateway device, at 304. For example, the first residential gateway device 102 of FIG. 1 may select the residential gateway device 140 based upon one or more of a policy, a determined bandwidth capacity, and a signal strength associated with the second gateway device 140.

The method further includes locating the second residential gateway device at the first residential gateway device using a wireless connection detection device, at 306. For example, the first residential gateway 102 may locate the second residential gateway 140 and the $n^{th}$ residential gateway 144 using a wireless connection detection device within the first residential gateway 102. The wireless connection detection device may be a combination of circuitry and an antenna to communicate and receive signals via a wireless link, such as a radio frequency link.

The method further includes authenticating the second connection using at least one of a credential stored at the first residential gateway device and a credential stored at the second residential gateway device, at 308. For example, the first residential gateway device 210 of FIG. 2 includes the first authentication module 258, which may be used to authenticate a communication path 274 with the second residential gateway device 202. The communication path 274 may be authenticated by the authentication module 258 using credentials stored at either or both of the first residential gateway device 210 and the second residential gateway device 202.

The method further includes routing traffic associated with the first residential gateway through a first virtual channel of the second connection and routing traffic associated with the second residential gateway through a second virtual channel of the second connection, at 310. By use of multiple channels and/or discrete channels, such as first and second virtual channels, traffic with respect to the second gateway as a destination of the first gateway may be separated from traffic having a destination of the second gateway. Thus, virtual channels or other multi-channel methods may be used to separate traffic based on destination. The separation of traffic by destination may be used by a service provider or a network to perform billing associated with the traffic of each respective destination.

The method further includes, in response to a detected service disruption, using the second residential gateway device selected at the first residential gateway device to establish a second connection to the first residential gateway device, at 312. For example, in response to a disruption of the link 160 of FIG. 1, the first residential gateway 102 may select the second residential gateway 140. In response to the disruption of the link 160, a connection may be established between the first residential gateway 102 and the second residential gateway 140 to provide an alternate communication path between the first residential gateway 102 and the access node 116. Thus, services may be recovered via the secondary connection in response to the detected services interruption. The illustrated method may be used to restore a service in response to a service disruption to the first residential gateway device via the second connection as described herein.

FIG. 3 thus shows a method to restore service to a residential gateway device experiencing a disruption. Disrupted service may be dynamically restored. Other benefits of the method may include reduced service calls and reduced service downtime. Additional sources of revenue and billing opportunities may be realized using the method. For example, revenue for services that would otherwise be disrupted may be collected based upon traffic provided using the secondary connection. Thus, the method offers benefits for both service providers and users of communication services.

Figure 4:
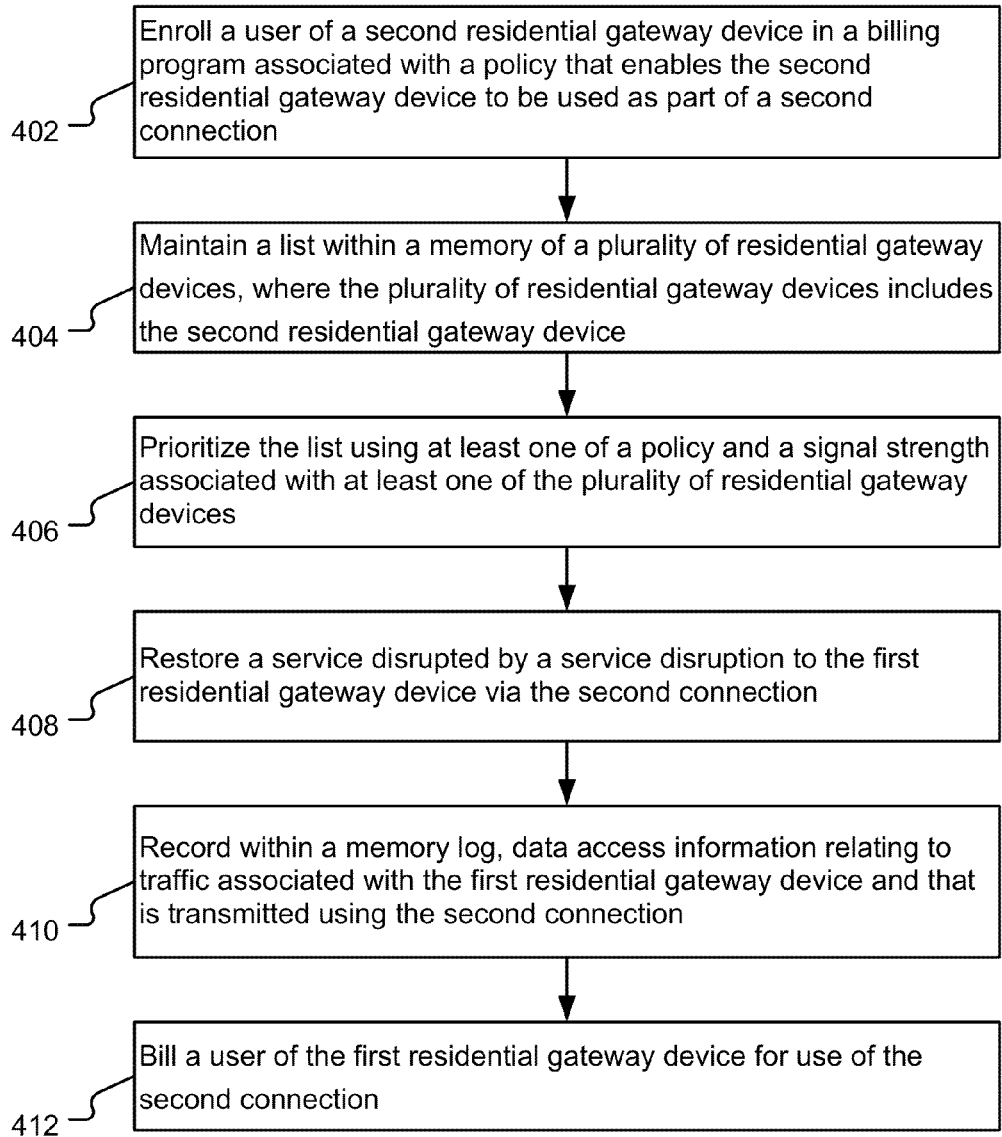
FIG. 4 is a flow diagram of a particular illustrative embodiment of a method of managing a service to a residential gateway device to respond to service disruptions.

Referring to FIG. 4, a particular embodiment of a method of providing service to a residential gateway is shown. The method includes enrolling a user of a second residential gateway device in a billing program associated with a policy that enables the second residential gateway device to be used as part of a second connection, at 402. For example, the second residential gateway 140 may be enrolled or otherwise associated with a billing program associated with a policy that enables the second residential gateway 140 to establish a connection to the first residential gateway 102, such as to respond to a service disruption.

The method further includes maintaining a list within a memory of a plurality of residential gateway devices, where the plurality of residential gateway devices includes the second residential gateway device, at 404. For example, each of the gateway devices 102, 140, 144 of FIG. 1 may include a memory that stores a list of other devices accessible via alternative connections in the event of a service disruption. As a further example, the first residential gateway 210 of FIG. 2 includes a secondary gateway list 270 stored within a memory device.

The method further includes prioritizing the list using at least one of a policy and a signal strength associated with at least one of the plurality of residential gateway devices, at 406. For example, the secondary gateway list 270 of the first residential gateway device 210 may include a prioritized list of residential gateways. The prioritized list may be based on signal strength, policy, or other applicable parameters.

The method further includes restoring a service in response to a service disruption to the first residential gateway device via the second connection, at 408. For example, a communication service disrupted by a link failure may be restored upon establishment of a second connection from a first residential gateway device 102 to the second residential gateway 140.

The method further includes recording within a memory log, data access information related to traffic associated with the first residential gateway that is transmitted using the second connection, at 410. An example of a data log is the data log 262 within the first residential gateway 210 of FIG. 2. Another example is the data log 250 within the second residential gateway 202 of FIG. 2. Each of these data logs may store access information related to traffic associated with the first residential gateway 210. The access log may also include traffic information based on the second connection between the first residential gateway 210 and the second residential gateway 202.

The method further includes billing a user of the first residential gateway device for use of the second connection, at 412. For example, a user of the first residential gateway 210 may be billed for establishing the second connection to the second residential gateway device 202 in the event the second connection is used to provide alternate service.

FIG. 4 thus shows a method to establish a secondary connection for a residential gateway device experiencing a disruption. Benefits of the method may involve additional sources of revenue and billing opportunities. For example, the disruption and alternative routing methodology may be offered as an enhanced service for particular subscribers. A subscriber to a communication service may opt for a subscription plan with higher subscription fees in order to have improved reliability of service through use of the alternative gateway routing process described herein. Alternatively, an owner of a second gateway may receive a discounted rate for participating in a dynamic gateway recovery program that enables communication with the first residential gateway device in the event of a service disruption. The method supports the establishment of pre-provisioned secondary channels at the time of an initial CPE installation, or dynamic secondary channel establishment and repair activities.

Figure 5:
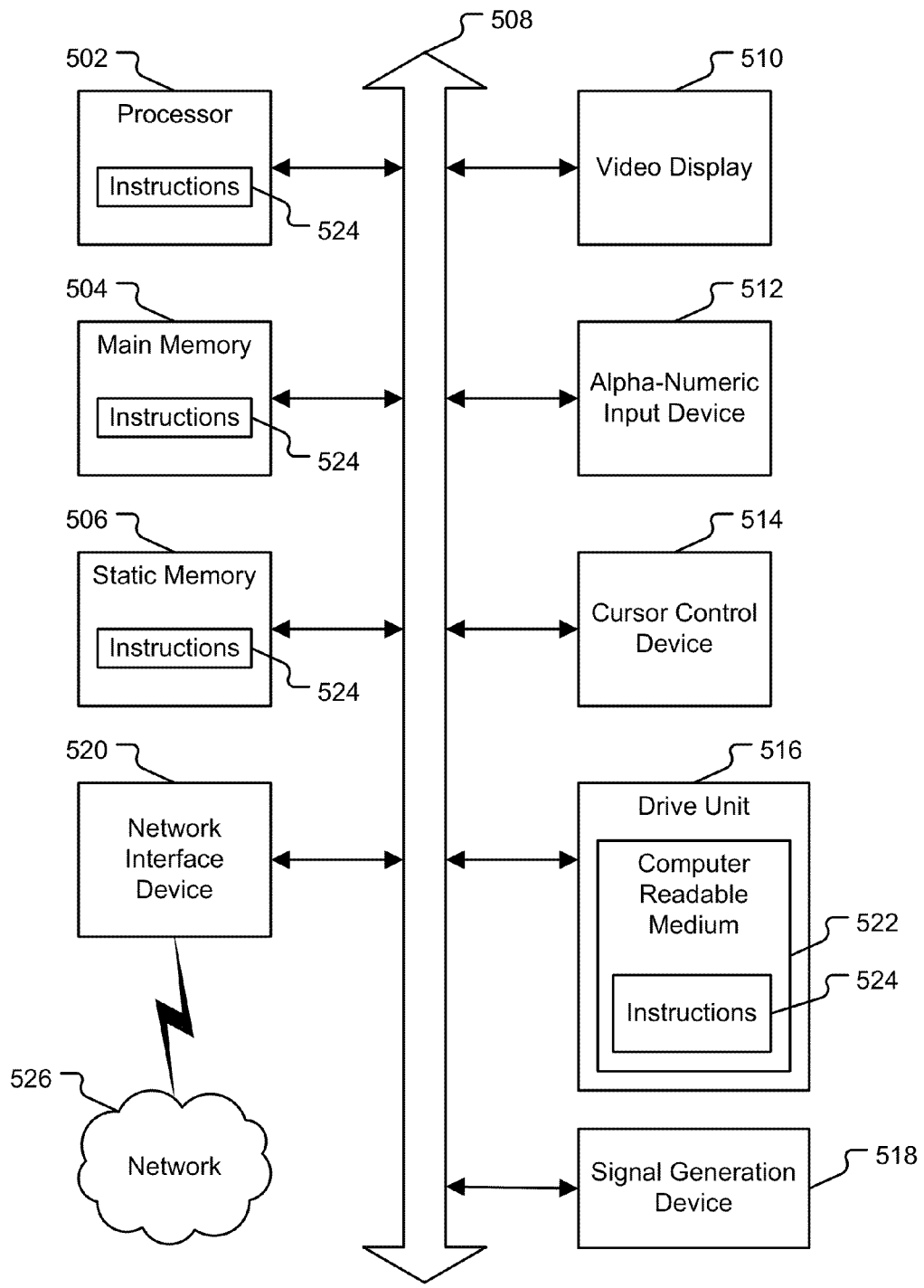
FIG. 5 is a block diagram of an embodiment of a general computer system configured to support residential gateway services.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a public network or a private network, to other computer systems or peripheral devices, including a residential gateway device 102 or an access network device 104, as shown in FIG. 1.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, or a solid state display. Additionally, the computer system 500 may include an input device 512, such as a keyboard, and a cursor control device 514. Further, the input device 512 may include a wireless input device, e.g., a remote control device. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The present disclosure contemplates a computer-readable medium that includes instructions 524 or receives and executes instructions 524 responsive to re-establish residential gateway device service via a network 526. The network 526 may communicate voice, video or data. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

Software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. For example, in a particular embodiment, an operations support system of a service provider may initiate establishing a secondary connection. For instance, the access node 116 of FIG. 1 may send a signal to the second residential gateway device 140. The signal may cause the second residential gateway device 140 to attempt to establish a secondary connection with the first residential gateway device of FIG. 1. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the disclosed embodiments is to be determined by the broadest permissible interpretation of the following claims and their equivalents, and shall not be restricted or limited by the foregoing detailed description.

What is claimed is:

1. A method of providing service to a residential gateway device, the method comprising:
    detecting, at a first residential gateway device, a service disruption associated with a first connection between an access node of a service provider and the first residential gateway device, wherein the access node is configured to provide a service to a plurality of residential gateway devices including the first residential gateway device, a second residential gateway device, and a third residential gateway device;
    selecting the second residential gateway device based on a bandwidth capacity of a second connection between the first residential gateway device and the second residential gateway device and based on a policy associated with the third residential gateway device, the policy restricting the third residential gateway device from providing a communication path from any other residential gateway device of the plurality of residential gateway devices to the access node;
    authenticating the second connection using a first credential stored at the first residential gateway device and a second credential stored at the second residential gateway device; and
    in response to the detected service disruption, establishing the second connection between the first residential gateway device and the second residential gateway device.

2. The method of claim 1, further comprising restoring, via the second connection, a service to the first residential gateway device that is disrupted by the service disruption.

3. The method of claim 1, further comprising enrolling a user of the second residential gateway device in a discounted billing program in exchange for enabling the second residential gateway device to be used as part of the second connection.

4. The method of claim 1, further comprising storing, within a memory of the second residential gateway device, data access information relating to traffic associated with the first residential gateway device that is transmitted using the second connection.

5. The method of claim 1, further comprising billing a user of the first residential gateway device increased subscription fees in exchange for alternative routing via the second connection.

6. The method of claim 1, further comprising maintaining, within a memory of the first residential gateway device, a list of a plurality of residential gateway devices usable to establish an alternative connection, wherein the plurality of residential gateway devices includes the second residential gateway device.

7. The method of claim 1, further comprising locating the second residential gateway device at the first residential gateway device using a wireless connection detection device.

8. The method of claim 1, further comprising routing traffic associated with the first residential gateway device and traffic associated with the second residential gateway device via separate virtual channels.

9. An apparatus, comprising:
    a wide area network module coupled to an access node of a service provider via a first connection to a first residential gateway device, wherein the access node is configured to provide a service to a plurality of residential gateway devices including the first residential gateway device, a second residential gateway device, and a third residential gateway device;
    a local area network module in communication with the wide area network module and coupled to at least one local computing device;
    a secondary channel module coupled to the local area network module and configured to:
        select the second residential gateway device based on a bandwidth capacity of a second connection between the first residential gateway device and the second residential gateway device and based on a policy associated with the third residential gateway device, the policy restricting the third residential gateway device from providing a communication path from any other residential gateway device of the plurality of residential gateway devices to the access node; and
        establish the second connection to the second residential gateway device; and
    an authentication module configured to authenticate the second connection using a first credential stored at the first residential gateway device and a second credential stored at the second residential gateway device.

10. The apparatus of claim 9, wherein the second connection is established in response to a service disruption associated with the first connection.

11. The apparatus of claim 9, wherein the first connection and the second connection are configured when the first residential gateway device is installed.

12. The apparatus of claim 9, further comprising a memory log storing data access information relating to traffic transmitted using the second connection.

13. The apparatus of claim 9, further comprising a memory storing the policy.

14. The apparatus of claim 9, further comprising a memory storing a prioritized list of a plurality of residential gateway devices, wherein the plurality of residential gateway devices includes the second residential gateway device.

15. The apparatus of claim 10, further comprising a self-healing module configured to attempt a self-repair of the service disruption prior to establishment of the second connection.

16. A non-transitory processor readable medium embodying executable instructions, the executable instructions comprising:
   instructions to detect, at an access node of a service provider, a service disruption associated with a first connection between the access node and a first residential gateway device;
   instructions to send a signal from the access node to a second residential gateway device to cause the second residential gateway device to initiate establishment of a second connection between the second residential gateway device and the first residential gateway device; and
   instructions to route, during the service disruption, data destined for the first residential gateway device to the second residential gateway device.

17. The processor readable medium of claim 16, further comprising instructions to restore a service disrupted by the service disruption.

* * * * *